Feb. 16, 1971 G. T. WEBB 3,564,410
DYNAMICALLY CALIBRATED VELOCITY INSTRUMENTATION TECHNIQUE
Filed Jan. 14, 1969
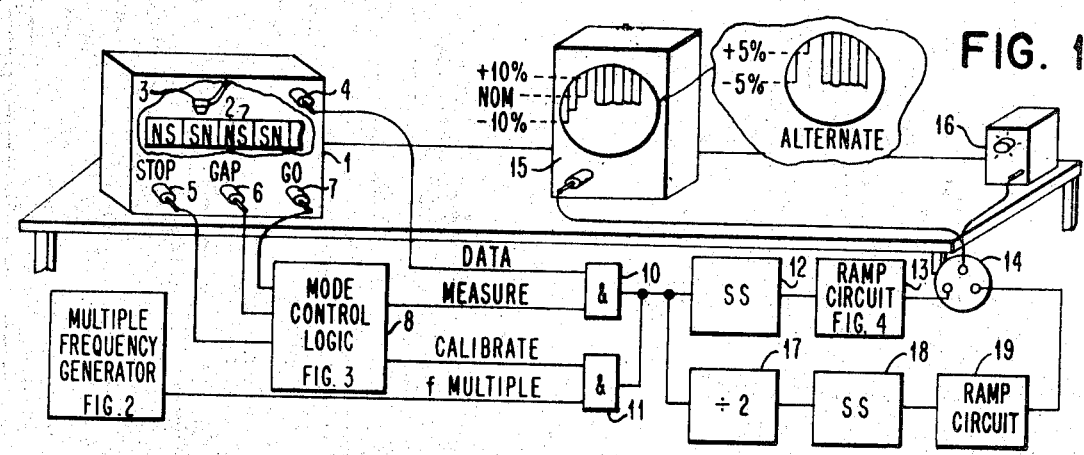
FIG. 1
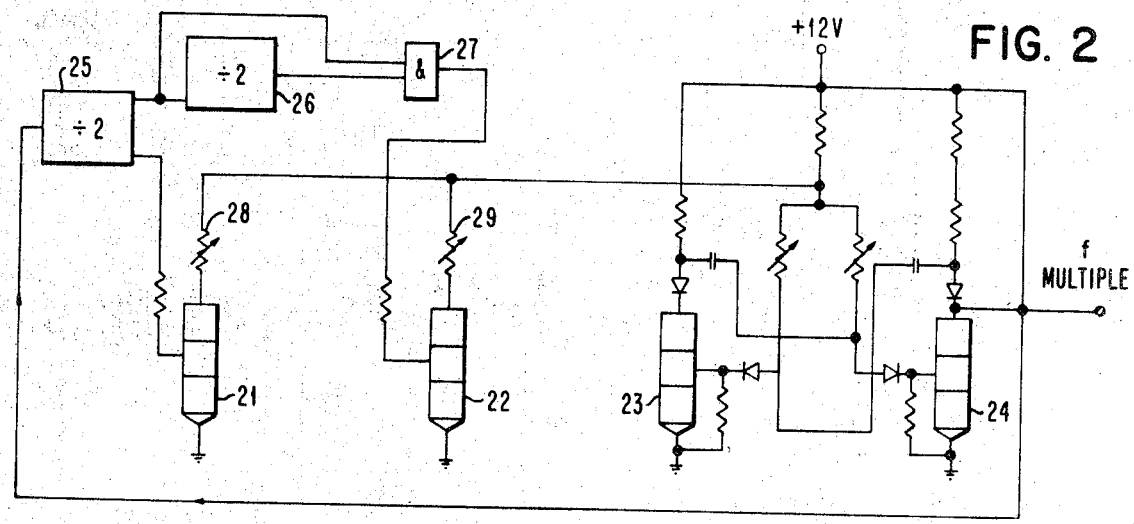
FIG. 2
FIG. 3
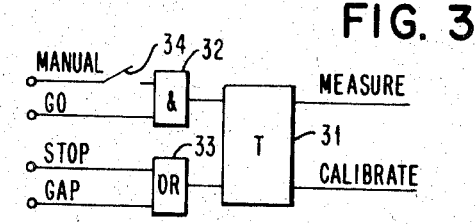
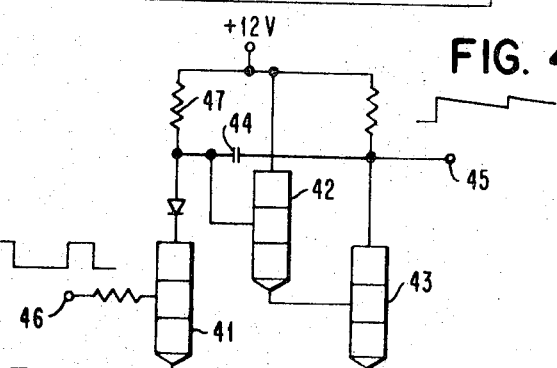
FIG. 4
FIG. 5
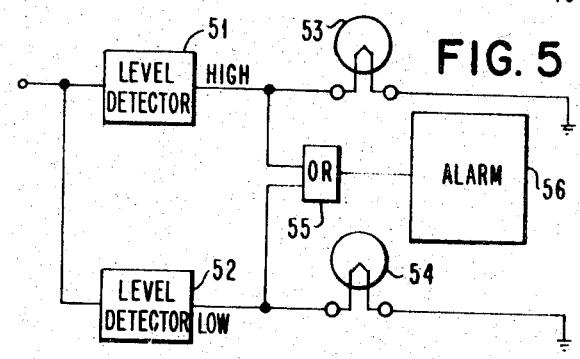
INVENTOR
GEORGE T. WEBB
BY D. Kendall Cooper
ATTORNEY

United States Patent Office 3,564,410
Patented Feb. 16, 1971

3,564,410
DYNAMICALLY CALIBRATED VELOCITY
INSTRUMENTATION TECHNIQUE
George T. Webb, Austin, Tex., assignor to International
Business Machine Corporation, Armonk, N.Y.
Filed Jan. 14, 1969, Ser. No. 790,929
Int. Cl. G01p 3/54
U.S. Cl. 324—172                                    9 Claims

ABSTRACT OF THE DISCLOSURE

This invention is a technique for accurately measuring the spacing of signals such as bit signals from a recording medium passing a recording head. The method includes development of a dynamically calibrated oscilloscope trace which provides instantaneous comparison of the signal frequency with a pattern of standard frequency signals. The system includes a generator of calibration signals of known frequency, mode control logic, mode control switches controlled by the mode control logic for selectively directing signals from the recording medium or signals from the multifrequency generator via frequency to voltage conversion circuits to display and alarm devices.

The method includes the following steps:

(1) Supplying an input signal as a series of pulses to be measured.

(2) Supplying a set of standard frequency signals.

(3) Multiplexing the input signal and the set of standard frequency signals according to predetermined sequence to establish a calibrated input signal sequence.

(4) Converting the calibrated input signal sequence to voltages corresponding to the frequency of the calibrated input frequency signal to provide a dynamically calibrated input frequency voltage signal.

(5) Utilizing the calibrated input frequency voltage signal for display and alarm purposes.

SUMMARY OF THE INVENTION

The velocity instrumentation system functions to measure the velocity of a recording medium having a known pattern of signals recorded upon it and passing through a record transport of unknown velocity characteristics. It functions by comparing the signal output of the record transport dynamically with a cyclical pattern of signals of known calibration frequencies. The calibration signals and data signals are multiplexed by mode control logic and mode control gating switches to a frequency-to-voltage conversion device for visual display on an oscilloscope or for automatic monitoring. The result in a production embodiment is a quick and simple testing capability to determine whether the record transport device is feeding the record media at the prescribed velocity.

It is an object of the invention to provide an instantaneous display of the relationship between an input signal of unknown frequency and a pattern of standard frequency used for calibration.

A feature of the invention is the use of the same circuit path for input signals and calibration signals so that the calibration is dynamically corrected for variations of circuit components.

An advantage of the invention is an instantaneous go, no-go comparison which permits high speed accurate manual and automatic testing.

Other objects, features and advantages of the invention will be apparent from the more particular description of a preferred embodiment of the invention and the accompanying drawings.

DRAWINGS

FIG. 1 is a semidiagrammatic representation of a dynamically calibrated velocity instrumentation system according to the invention.

FIG. 2 is a semischematic block diagram showing details of multiple frequency generator 9 of FIG. 1.

FIG. 3 is a diagram of mode control logic 8 of FIG. 1.

FIG. 4 is a schematic diagram of details of ramp circuit 13 of FIG. 1.

FIG. 5 is a diagram of details of automatic monitor 16 of FIG. 1.

DETAILED DESCRIPTION

The velocity instrumentation system has the purpose of measuring the velocity of a moving item by comparing the frequency of signals related to item velocity with a set of standard frequency signals. In a magnetic media record transport, for example, recorded signals (if recorded at fixed intervals along a longitudinal path of record media travel) produce signals whose frequency is a function of velocity.

FIG. 1—DYNAMICALLY CALIBRATED VELOCITY INSTRUMENTATION

Record transport 1 includes a record medium 2 having a finite velocity of travel with respect to read head 3. Record medium 2 has a known pattern of signals recorded thereon and therefore provides a signal pattern related to velocity.

Record transport 1 is equipped with normal record transport features, including a data output terminal 4, and a set of status output terminals such as terminals 5-6-7 which may be associated with transport status STOP, GAP and GO, respectively.

The nature of the ordinary transport is such that DATA signals are normally provided only in GO status. The status output terminals 5-6-7 are connected to Mode Control logic 8 to provide mode signal MEASURE during times when DATA signals are present and to provide mode signal CALIBRATE during all other times.

Multiple frequency generator 9 is arranged to provide a recurring pattern of standard frequencies such as high limit, nominal and low limit frequencies for the record transport to be monitored.

Mode control logic 8 is connected to And circuits 10 and 11 in such fashion that And circuits 10 and 11 work in complementary fashion. And circuit 10 is connected to data output terminal 4 of record transport 1 in such fashion that it gates record signals to circuit 12 when in MEASURE mode. And circuit 11 is connected to multiple frequency generator 9 to provide multiple frequency signals to single shot circuit 12 during CALIBRATE mode. Single shot 12 provides a fixed duration timing signal to ramp circuit 13. Ramp circuit 13 connects through switch 14 to oscilloscope 15 and to alarm unit 16. The trace shown on oscilloscope 15 shows calibration signals at —10%, nominal and +10% at the left side and shows in its center portion the frequency representation of a set of data signals whose frequency varies from almost 10% above nominal to nominal. Automatic monitor 16 is arranged with detector circuits to provide an alarm signal when the output is lower than limit frequency or higher than limit frequency.

ALTERNATE MEASURING CIRCUIT

Alternate measuring circuit 17, 18, and 19 provides outputs which measure time between every second flux change to eliminate differences in the detection point of positive and negative transitions. The alternate measuring circuit includes divide-by-two circuit 17, in addition to single shot 18 and ramp circuit 19 (which are similar to single shot 12 and ramp circuit 13) of the primary measuring circuit. Divide-by-two circuit 17 has the result of having the allowable variation from nominal. Where the primary measuring circuit provides for +10%, nominal and −10% calibration signals on the oscilloscope trace, the alternate measuring circuit eliminates the nominal calibration signal and provides +5% and −5% calibration signals on oscilloscope 15 as shown in the cloud in FIG. 1.

In operation, the dynamically calibrated velocity instrumentation method includes the following steps:

(1) Supplying input signals from recording medium 2 which is recorded in a predetermined pattern to provide a series of pulses related to the velocity of record transport.

(2) Supplying a set of standard frequency signals from multiple frequency generator 9 to And circuit 11.

(3) Sequencing the input signal and the set of standard frequency signals according to a frequency predetermined by the pattern of recording on record medium 2 as interpreted by mode control logic 8 to establish a calibrated input signal sequence.

(4) Converting the calibrated input signal sequence by measuring circuit 12–13 or alternate measuring circuit 17–19 to voltages corresponding to the frequency of the calibrated input frequency signal, to provide a dynamically calibrated input frequency voltage signal.

(5) Utilizing the calibrated input frequency voltage signal by connecting it to oscilloscope 15 for display and to automatic monitor 16 for alarm purposes.

FIG. 2—MULTIPLE FREQUENCY GENERATOR

FIG. 2 is a semischematic diagram showing details of a suitable multiple frequency generator 9 of FIG. 1. The multiple frequency generator functions to provide a recurring cycle of frequencies (1) low, (2) nominal, (3) high, (4) nominal.

The multiple frequency generator includes a collector coupled multivibrator made up of transistors 23 and 24 together with supporting passive circuits. A frequency cycle control logic made up of divide by two circuits 25 and 26, with And circuit 27 provides a cycle pattern of: (1) low frequency control signal, (2) nominal frequency control signal, (3) the absence of a frequency control signal, which results in a high frequency output from the oscillator, and (4) nominal frequency control signal.

Variable resistors 28 and 29 provide for manual setting of limits.

Other techniques for providing a cyclic or noncyclic complex pattern of frequency signals for calibration purposes might be substituted as the measuring function requires.

FIG. 3—MODE CONTROL LOGIC

The mode control logic functions to activate a connection for data signals when available and calibration signals during other times. Inputs to the mode control logic are the status inputs from terminals 5–7 of record transport (1) which may in turn be responsive to the pattern of recording on the record medium, (2) which is the source of the signals for the test. More complex mode control logic might be developed as more complex measuring requirements dictate. The mode control logic of the preferred embodiments includes set-reset trigger 31. And circuit 32 is arranged to set trigger 31 to the measure mode upon coincidence of the status signal GO and a manual switch 34 which serves merely as a manual over-ride. Or circuit 33 operates to place mode control trigger 31 in the calibrate mode upon occurrence of any one of the status signals such as STOP and GAP which are indicative of a mode other than measure mode.

The mode control logic can be extended as required for the operation to be performed to measure a continuous stream of signals. For example, it might be advisable to have a fixed frequency pulse input to Or circuit 33 which would maintain calibrate signals on the oscilloscope face in interspersed relationship with a significant fraction of the data signals forming the basis of the measurement.

FIG. 4—RAMP CIRCUIT

Ramp circuit 13, FIG. 11, provides a ramp output at terminal 45 in response to a pulse input at terminal 46. It is designed to have a fast rise to the referenced voltage, when the input voltage rises, and to produce a linear voltage change porportional to the elapsed time when the input voltage falls. The timing components of the circuit, capacitor 44 and resistor 47, are chosen so that the voltage never reaches the zero level for the times to be measured. In operation, a voltage rise pulse at terminal 46 switches transistor 41 to the on condition which effectively connects one electrode of capacitor 44 at the base of transistor 42 to ground potential cutting off transisor 42 and transistor 43. This causes the output at terminal 45 to rise quickly to +12 volts. When the voltage pulse at terminal 46 falls, transistor 41 is cut off and capacitor 44 begins to charge up to the +12 potential through resistor 47. As capacitor 44 charges it provides a charge related varying signal to the base of transistor 42 which in turn varies the conductive characteristic of transistor 43 in a linear manner to provide for the ramp output at terminal 45.

Other suitable ramp circuits may be used interchangeably. And circuits, Or circuits, divide-by-two circuits, voltage level detectors and triggers are ordinary standard circuits.

FIG. 5—AUTOMATIC MONITOR

FIG. 5 is a semischematic block diagram of automatic monitor 16 of FIG. 1. The function of the automatic monitor is to provide an alarm when the frequency being measured falls below or goes above the defined limits. The calibration signals define the limits; the monoitor is set so as to accept the calibration signals by a narrow margin. The monitor thus reacts to frequencies being measured which fall outside the limits, and also reacts to any drift of the calibration signals beyond limits. The automatic monitor includes voltage level detector circuits 51 and 52 to which are connected suitable signal lamps 53 and 54 respectively, and which are commonly connected by Or circuit 55 to an alarm 56. Alarm 56 can be used to ring a bell or to perform a function such as punching a hole in a quality control card related to the device being tested. Alarm 56 can be also used to shut down the velocity instrumentation system pending review by the operator.

While the invention has been particularly shown and described with reference to a preferred embodiment thereof, it will be understood that those skilled in the art that he foregoing and other changes in form and detail may be made therein without departing from the spirit and scope of the invention.

What is claimed is:

1. A method for measuring the actual velocity of a moving record medium and medium transport with respect to a standard velocity on a real time basis, the record medium having indicia spaced at predetermined intervals along the direction of movement of said record medium, comprising the following steps:

(a) sensing the indicia on said medium during movement of said medium;

(b) generating input signals from said sensed indicia, said input signals occurring at a frequency that is representative of the actual velocity of said record medium to be measured;

(c) supplying a series of reference signals occurring at a frequency that is representative of a standard velocity;

(d) multiplexing the input signals and the reference signals according to a desired calibration sequence under control of the indicia on said record medium to establish at least a sequence of calibration signals comprising sub-sequences of reference velocity signals and actual velocity signals;
(e) converting the calibration signal sequence to reference velocity voltages and actual velocity voltages corresponding respectively in proportion to the respective frequencies of the reference velocity signals and actual velocity signals,
(f) applying the respective voltages to a display device; and
(g) generating in said display device a visual display enabling the determination of the difference, if any, between the actual velocity of said medium and said standard velocity.

2. The method according to claim 1 wherein the reference signals supplied at step (c) comprise at least two series of signals generated at diverse frequencies representative of relatively higher and lower limits of a range of frequencies within which said input signals should preferably fall.

3. An instrumentation system to enable the determination of the actual frequency relationship of periodic data signals from an input source with respect to a reference frequency, said input source also providing status signals occurring in timed relation to said periodic signals, comprising:
(a) a multiple frequency generator for generating reference signals of predetermined frequency;
(b) mode control logic responsive to said status signals to provide mode control signals in a predetermined sequence of measure mode signals and calibrate mode signals;
(c) a multiplexing circuit having multiple inputs and an output and arranged to receive said periodic signals to be measured, and said reference signals as inputs, said multiplexing circuit being responsive to said measure mode signals to gate said periodic signals through to said output and being responsive to said calibrate mode signals to gate said reference signals through to said output in accordance with said predetermined sequence;
(d) frequency to voltage conversion means responsive to periodic signals and reference signals from said multiplexing circuit to provide voltage ramp outputs representative of the frequency of the supplied signals and also in accordance with said predetermined sequence; and
(e) utilizing means responsive to said voltage ramp outputs to provide an indication of the predetermined sequence of signals enabling recognition of the frequency relationship between the data signals and the reference signals.

4. An instrumentation system according to claim 3, wherein said utilizing means comprises an oscilloscope.

5. An instrumentation system according to claim 3, wherein said utilizing means comprises a high-low signal level detector.

6. An instrumentation system according to claim 3, wherein said mode control logic further comprises a set-reset trigger settable to a measure mode by a status signal from said input device providing signals to be measured, said set-reset trigger providing a measure mode signal when in measure mode and a calibrate mode signal when not in measure mode.

7. An instrumentation system according to claim 3, wherein the timing relationships of the periodic data signals and the reference signals provided by said multiple frequency generator are directly related to relative velocity of the record medium and its transport reading head, and further comprising:
transport means in said input device for relatively moving a record medium having a standard pattern of indicia recorded thereon which are spaced at intervals in the direction of movement of said medium and representative in combination of the velocity relationship of said medium with respect to a reading head.

8. An instrumentation system according to claim 3, further comprising:
a timing single shot and a ramp circuit in said frequency to voltage conversion means for providing ramp signals representative of said periodic and reference signals.

9. An instrumentation system according to claim 8, further comprising:
a first ranging means and second ranging means in said frequency to voltage conversion means, said second ranging means comprising a frequency divide, a timing single shot and a ramp circuit.

References Cited

UNITED STATES PATENTS 2,919,401 12/1959 Cole _____ 324—78

FOREIGN PATENTS 749,525 5/1956 Great Britain _____ 324—70

MICHAEL J. LYNCH, Primary Examiner

U.S. Cl. X.R.

324—79, 140